Oct. 15, 1935.  J. H. BARSE  2,017,390
CONTROL
Filed Feb. 6, 1934  2 Sheets-Sheet 1
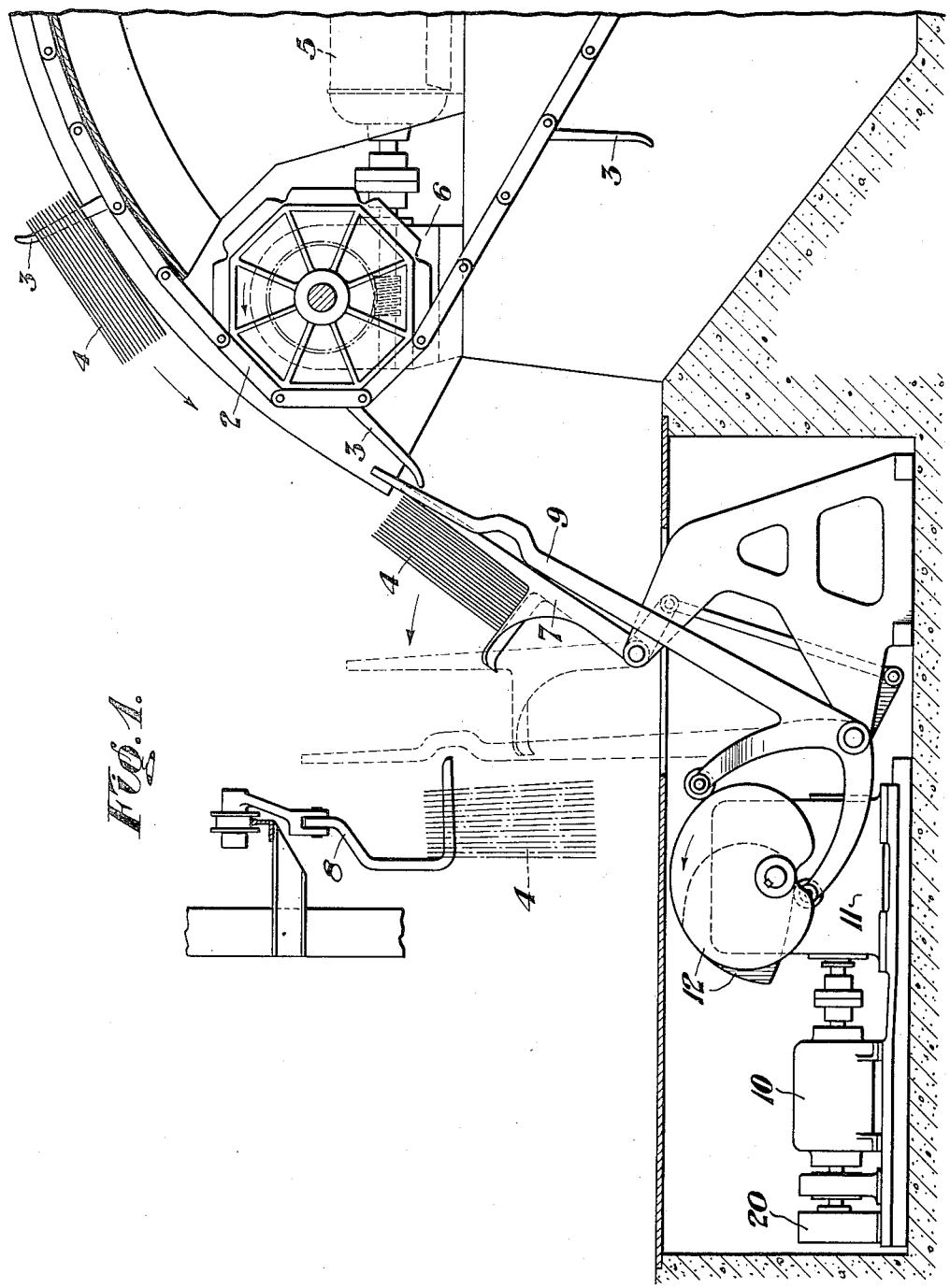

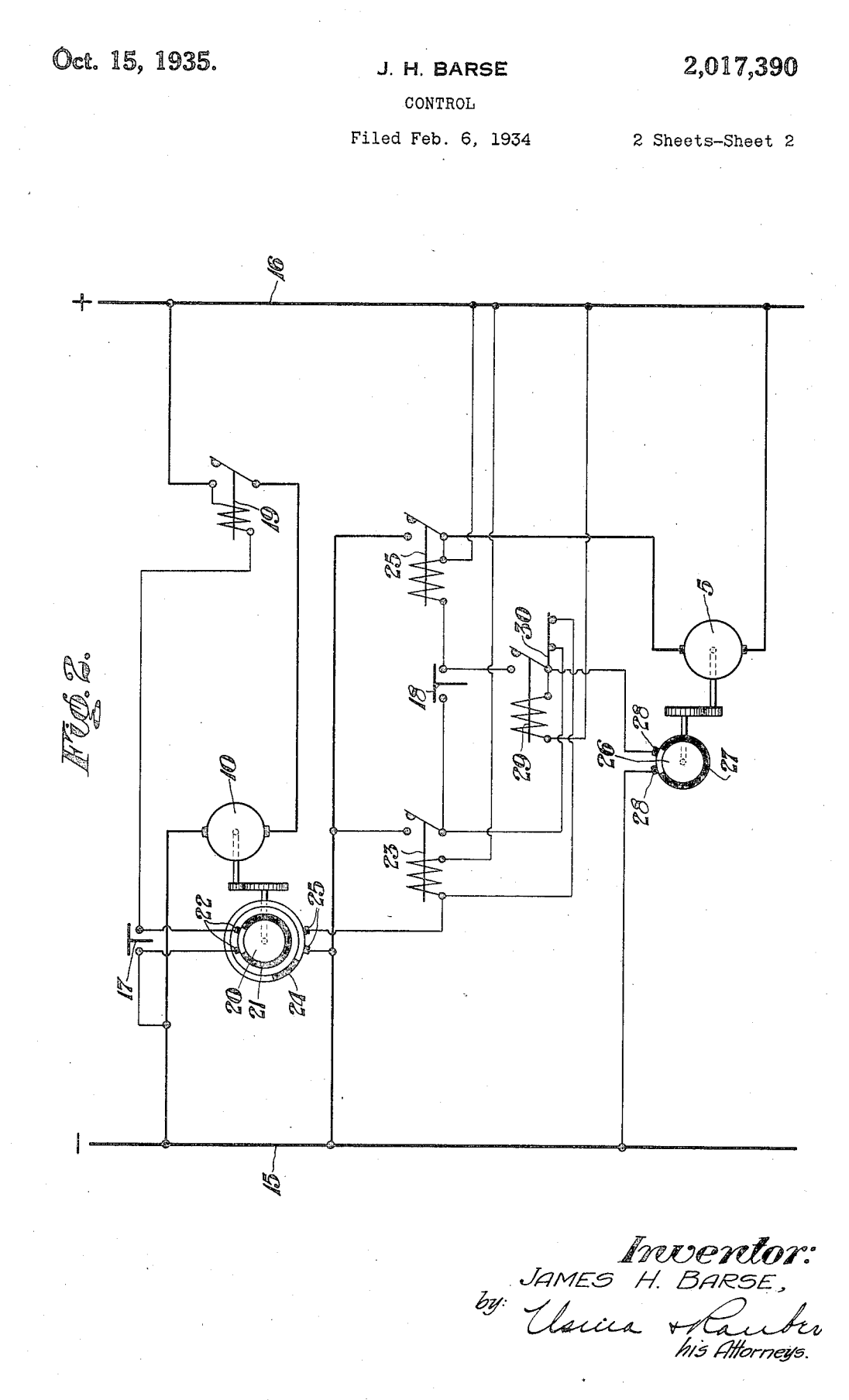

Oct. 15, 1935.  J. H. BARSE  2,017,390
CONTROL
Filed Feb. 6, 1934   2 Sheets-Sheet 2

Inventor:
JAMES H. BARSE,
by Usina + Rauber
his Attorneys.

UNITED STATES PATENT OFFICE 2,017,390

CONTROL

James H. Barse, Lakewood, Ohio

Application February 6, 1934, Serial No. 710,019

1 Claim. (Cl. 198—27)

This invention is a control operating in combination with a conveyer and a mechanism for transferring loads from this conveyer to another.

It is particularly useful when the conveyer is of the type used in rod mills to carry rod bundles away from the reels, and when the transferring mechanism is of the type disclosed by Bruce N. Bletso and Walter V. Magee in their Patent No. 1,869,354. This is because a conveyer of this type is provided with spaced dogs which positively engage the rod bundles while moving them along, and the mechanism covered by this patent is of such character that it functions to individually transfer these rod bundles from this conveyer to another, it being therefore necessary to synchronize the operation of the conveyer respecting the transferring mechanism so as to be certain that the former is not operated while a rod bundle is still being handled by the latter. The control that is about to be described is intended to automatically compel the synchronized operation of these machines so as to prevent the accidents which must inevitably result if the conveyer is operated while a bundle is still on the transferring machine.

Referring to the accompanying drawings, Figure 1 is a side view showing the two conveyers and the transferring mechanism, while Figure 2 is a wiring diagram illustrating the principles of the control for the respective motors of the conveyer and of the transferring mechanism.

These drawings show the discharge end of an endless conveyer 2, the latter including spaced dogs 3 which engage rod bundles 4 so as to drag them away from the reels of a rod mill. This conveyer is driven by a motor 5 through a gear box 6. The transferring mechanism includes a rod bundle receiving member 7 which is arranged to swing from the end of the conveyer 2 to another conveyer 8, an arm 9 swinging with and beyond the member 7 so as to force the bundles onto the other conveyer. This mechanism is driven by a motor 10 through a gear box 11 and cams 12. Since the details are disclosed by the patent mentioned, no further description of this mechanism is necessary.

Operation of this conveyer and mechanism has heretofore depended upon human skill and vigilance. This has not been entirely satisfactory because it is necessary that the conveyer 2 be controlled by a man in the pulpit near the reels, while the transferring mechanism must be operated by another man from a position where he can observe whether the conveyer 8 is in a position to receive a rod bundle. Since these positions are quite far apart, it is impossible for the men to cooperate closely. Consequently, there have been accidents caused by the conveyer bringing a rod bundle to the transferring mechanism while a bundle was still on the latter or while the latter had not completely returned to its receiving position. As stated, the control is for the purpose of preventing such trouble.

Referring now to the wiring diagram which discloses this control.

The two motors 5 and 10 are powered by lines 15 and 16. A push-button 17 effects manual control of the conveyer motor 10, and another push-button 18 permits manual control of the conveyer motor 5. As previously explained, these push-buttons must necessarily be quite far apart, so that their operators cannot easily cooperate to manually maintain the necessary synchronism.

When the switch 17 is closed, it operates a relay switch 19 which starts the motor 10. The latter is geared to a limit switch 20 that includes a rotary segment 21 which closes the circuit through the push-button 17, after the motor 10 has started, by way of suitably connected brushes 22. A gap in this segment opens this circuit at the end of the transferring cycle of the mechanism, so that the relay 19 is deenergized at the proper time. Thus, each operation of this push-button effects a single transferring operation of the mechanism.

Before the motor 5 can be started by the push-button switch 18, a relay switch 23 must be closed, since the two are in series. This relay switch 23 is operated through the limit switch 20, the latter being provided with a second contacting segment 24 which momentarily closes the operating circuit through this relay switch, by way of brushes 25, at a predetermined period during the operation of the conveying mechanism. Once closed, this relay is sealed by its own contacts which then provide a path for its operating current. For obvious reasons, the contacting segment 24 of the limit switch 20 should be set so that this period occurs near the completion of the transferring mechanism's operating cycle.

When the relay switch 23 is thus closed, operation of the push-button switch 18 operates a relay switch 25 which controls the transmission of power to the motor 5. Since it is impossible to effect this transmission of power until the transferring mechanism is in a position to receive another rod bundle, there is no chance for the man near the reels to cause an accident.

The conveyer motor 5 is geared to a limit switch 26. This switch includes a rotary contacting segment 27 which, through brushes 28, operates a relay switch 29 which shunts the circuit around the push-button 18 soon after the motor 5 starts, and continues operation of the relay 25, this causing the motor 5 to continue to run after the push-button switch 18 is released. Operation of the relay switch 29 simultaneously opens a mechanically interconnected switch 30 which is in series with the relay switch 23, this opening the operating circuit to the latter. This does not deenergize the relay switch 25, because the switch 29 now shunts the circuit around the relay switch 23 and is therefore maintaining the necessary closed circuit.

The limit switch 26 is properly geared to the conveyer motor 5 so as to bring a gap in its segment 27 into registration with the brushes 28 when the conveyer has moved a predetermined extent. This extent should ordinarily be proportioned to that which is necessary to discharge one of the rod bundles 4 onto the transferring mechanism, this being fixed by the spacing of the dogs 3. When such registration occurs, the operating circuit through the relay switch 29 is broken, this then opening the operating circuit through the relay switch 25 which stops the conveyer motor 5, since the latter's power circuit is through this relay switch.

Practical operation of the foregoing is as follows:

Assuming a rod bundle is being held by the transferring mechanism as is shown by the drawings, it is impossible to start the conveyer motor 5 by means of the push-button 18 because the relay switch 23 is open. However, the man at the transferring mechanism may operate the push-button 17 so that the transferring mechanism's motor 10 operates to effect a complete transferring cycle, and then stops. Towards the end of this cycle, the limit switch 20 energizes the operating circuit through the relay 23, and the latter is consequently closed.

It is now possible for the man at the reels to start the conveyer. This he does by operating the push-button 18, which operates the relay switch 25 so that the motor 5 starts. When the latter has operated sufficiently to close the circuit through the limit switch 26, the push-button may be released, since its circuit is then shunted by means of the relay switch 29. This relay switch simultaneously opens the switch 30 so that the relay switch 23 is opened. It is now impossible to restart the conveyer motor 5 until the transferring mechanism has operated through another cycle, since this is necessary to reoperate the relay switch 23. When the conveyor has moved the extent determined by the limit switch 26, the motor 5 is deenergized.

While I have shown and described one specific embodiment of my invention in accordance with the patent statutes, it is to be understood that the invention is not to be limited exactly thereto, except as defined in the following claim.

I claim:

A control for the combination of an endless conveyer having a driving motor and a mechanism for individually transferring loads away from said conveyer, said control including the combination of manually operable means for starting said motor, means responsive to operation of said conveyer a predetermined extent for automatically stopping said motor, means responsive to operation of the second named means for rendering the first named means inoperative and means responsive to operation of said transferring mechanism a predetermined extent for rendering the first named means operative.

JAMES H. BARSE.